United States Patent
Haldeman et al.

(10) Patent No.: US 11,440,651 B1
(45) Date of Patent: Sep. 13, 2022

(54) SPHERICAL BEARING CENTRIFUGAL FORCE RETENTION LINK

(71) Applicant: Bell Textron Inc., Fort Worth, TX (US)

(72) Inventors: Andrew Paul Haldeman, Fort Worth, TX (US); Paul Wayne Woolbright, Euless, TX (US); Timothy McClellan Mosig, Richland Hills, TX (US); George Matthew Thompson, Lewisville, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 17/188,785

(22) Filed: Mar. 1, 2021

(51) Int. Cl.
*B64C 27/35* (2006.01)
*B64C 27/48* (2006.01)
*B64C 27/82* (2006.01)

(52) U.S. Cl.
CPC .............. *B64C 27/35* (2013.01); *B64C 27/48* (2013.01); *B64C 27/82* (2013.01); *B64C 2027/8254* (2013.01)

(58) Field of Classification Search
CPC ................................ B64C 27/35; B64C 27/48
See application file for complete search history.

(56) References Cited

U.S. PATENT DOCUMENTS

| | | | |
|---|---|---|---|
| 3,594,097 A | 7/1971 | Mouille et al. | |
| 3,765,267 A | 10/1973 | Bourquardez et al. | |
| 5,306,119 A | 4/1994 | Bandoh et al. | |
| 5,542,818 A | 8/1996 | Monvaillier et al. | |
| 8,444,382 B2 * | 5/2013 | Stamps | B64C 27/35 416/106 |
| 8,662,847 B2 * | 3/2014 | Kuntze-Fechner | B64C 27/33 416/134 A |
| 9,499,262 B2 | 11/2016 | Foskey et al. | |
| 10,059,438 B2 | 8/2018 | Rauber et al. | |
| 2007/0020104 A1 | 1/2007 | Moffitt et al. | |
| 2012/0087797 A1 | 4/2012 | Kuntze-Fechner | |
| 2013/0032664 A1 | 2/2013 | Kebrle et al. | |
| 2020/0094942 A1 | 3/2020 | Jarrett et al. | |

FOREIGN PATENT DOCUMENTS

CA    2982070 A1    12/2017

* cited by examiner

*Primary Examiner* — Igor Kershteyn
*Assistant Examiner* — John S Hunter, Jr.
(74) *Attorney, Agent, or Firm* — Shackelford, Bowen, McKinley & Norton, LLP

(57) ABSTRACT

A spherical bearing centrifugal force retention link includes an inboard spherical bearing to attach to a rotor hub and an outboard spherical bearing to attach to a rotor blade. In use, the inboard spherical bearing and the outboard spherical bearing react centrifugal force radially and a torsional moment of the centrifugal force link is substantially constant throughout the rotor blade pitch range.

20 Claims, 8 Drawing Sheets

SPHERICAL BEARING CENTRIFUGAL FORCE RETENTION LINK

STATEMENT REGARDING FEDERALLY SPONSORED RESEARCH OR DEVELOPMENT

This invention was made with government support under Agreement No. W911W6-19-9-0002, awarded by the U.S. Army Contracting Command-Redstone Arsenal. The government has certain rights in the invention.

TECHNICAL FIELD

This disclosure relates in general to the field of aircraft, and more particularly, but not by way of limitation, to a centrifugal force link between a rotor blade and a rotor hub.

BACKGROUND

This section provides background information to facilitate a better understanding of the various aspects of the disclosure. It should be understood that the statements in this section of this document are to be read in this light, and not as admissions of prior art.

Rotors or fans implementing tension-torsion straps can be subjected to comparatively high control loads due to the torsional spring rate of the tension-torsion strap when centrifugal force is applied. As blade pitch increases, so does the torsional moment that is exerted by the tension-torsion strap. At maximum blade pitch angle a tension-torsion strap moment can account for about 45 percent of the total pitching moment. Increased control loads drive weight into the control system.

SUMMARY

An exemplary rotor blade assembly includes a hub rotatable about a rotational axis, a rotor blade extending radially from the hub along a pitch axis and having a rotor blade pitch range, and a centrifugal force link having an inboard spherical bearing attached to the hub and an outboard spherical bearing attached to the rotor blade.

An exemplary rotorcraft includes a rotor comprising a hub rotatable about a rotational axis, a rotor blade extending radially from the hub along a pitch axis and having a rotor blade pitch range, and a centrifugal force link having an inboard spherical bearing attached to the hub and an outboard spherical bearing attached to the rotor blade, wherein the inboard spherical bearing and the outboard spherical bearing react centrifugal force radially, and a torsional moment of the centrifugal force link is substantially constant throughout the rotor blade pitch range.

An exemplary ducted fan includes a duct having a central axis, a rotor assembly located in the duct, the rotor assembly comprising a hub rotatable about a rotational axis coaxial with the central axis, a rotor blade extending radially from the hub along a pitch axis and having a rotor blade pitch range, and a centrifugal force link having an inboard spherical bearing attached to the hub and an outboard spherical bearing attached to the rotor blade, wherein the inboard spherical bearing and the outboard spherical bearing react centrifugal force radially, and a torsional moment of the centrifugal force link is substantially constant throughout the rotor blade pitch range.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
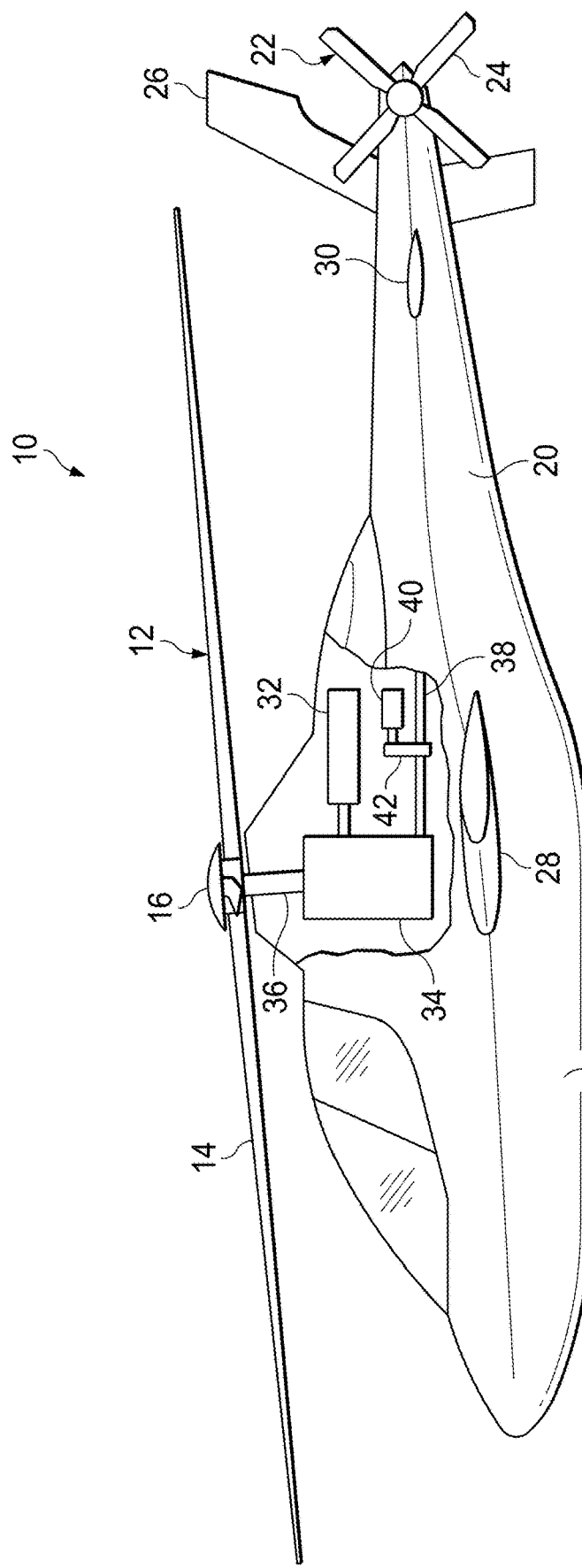
FIG. 1 illustrates an exemplary rotorcraft implementing a spherical bearing centrifugal force retention link in a rotor system.

It is to be understood that the following disclosure provides many different embodiments, or examples, for implementing different features of various illustrative embodiments. Specific examples of components and arrangements are described below to simplify the disclosure. These are, of course, merely examples and are not intended to be limiting. For example, a figure may illustrate an exemplary embodiment with multiple features or combinations of features that are not required in one or more other embodiments and thus a figure may disclose one or more embodiments that have fewer features or a different combination of features than the illustrated embodiment. Embodiments may include some but not all the features illustrated in a figure and some embodiments may combine features illustrated in one figure with features illustrated in another figure. Therefore, combinations of features disclosed in the following detailed description may not be necessary to practice the teachings in the broadest sense and are instead merely to describe particularly representative examples. In addition, the disclosure may repeat reference numerals and/or letters in the various examples. This repetition is for the purpose of simplicity and clarity and does not itself dictate a relationship between the various embodiments and/or configurations discussed.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "inboard," "outboard," "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the terms "connect," "connection," "connected," "in connection with," and "connecting" may be used to mean in direct connection with or in connection with via one or more elements. Similarly, the terms "couple," "coupling," and "coupled" may be used to mean directly coupled or coupled via one or more elements. Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include such elements or features.

Referring to FIG. 1, a rotorcraft in the form of a helicopter is schematically illustrated and generally designated 10. The primary propulsion assembly of helicopter 10 is a main rotor assembly 12. Main rotor assembly 12 includes a plurality of rotor blades 14 extending radially outward from a main rotor hub 16. Main rotor assembly 12 is coupled to a fuselage 18 and is rotatable relative thereto. The pitch of rotor blades 14 can be collectively and/or cyclically manipulated to selectively control direction, thrust, and lift of helicopter 10. A tailboom 20 is coupled to fuselage 18 and extends from fuselage 18 in the aft direction. An anti-torque system 22 includes a tail rotor assembly 24 coupled to an aft end of tailboom 20. Anti-torque system 22 controls the yaw of helicopter 10 by counteracting the torque exerted on fuselage 18 by main rotor assembly 12. In the illustrated embodiment, helicopter 10 includes a vertical tail fin 26 that provides stabilization to helicopter 10 during high-speed forward flight. In addition, helicopter 10 includes wing members 28 that extend laterally from fuselage 18 and wing members 30 that extend laterally from tailboom 20. Wing members 28, 30 provide lift to helicopter 10 responsive to the forward airspeed of helicopter 10, thereby reducing the lift requirement on main rotor assembly 12 and increasing the top speed of helicopter 10.

Main rotor assembly 12 and tail rotor assembly 24 receive torque and rotational energy from a main engine 32. Main engine 32 is coupled to a main rotor gearbox 34 by suitable clutching and shafting. Main rotor gearbox 34 is coupled to main rotor assembly 12 by a mast 36 and is coupled to tail rotor assembly 24 by tail rotor drive shaft 38. In the illustrated embodiment, a supplemental engine 40, or supplemental power unit, is coupled to tail rotor drive shaft 38 by a supplemental engine gearbox 42 that provides suitable clutching therebetween.

Rotorcraft 10 is merely illustrative of a variety of aircraft that can implement the embodiments disclosed herein. Other aircraft implementations can include hybrid aircraft, tiltwing aircraft, tiltrotor aircraft, quad tiltrotor aircraft, unmanned aircraft, gyrocopters, propeller-driven airplanes, compound helicopters, drones, and the like. As such, those skilled in the art will recognize that the spherical bearing centrifugal force retention link of the present disclosure can be integrated into a variety of aircraft configurations. It should be appreciated that even though aircraft are particularly well-suited to implement the embodiments of the present disclosure, non-aircraft vehicles and devices can also implement the embodiments.

Figure 2:
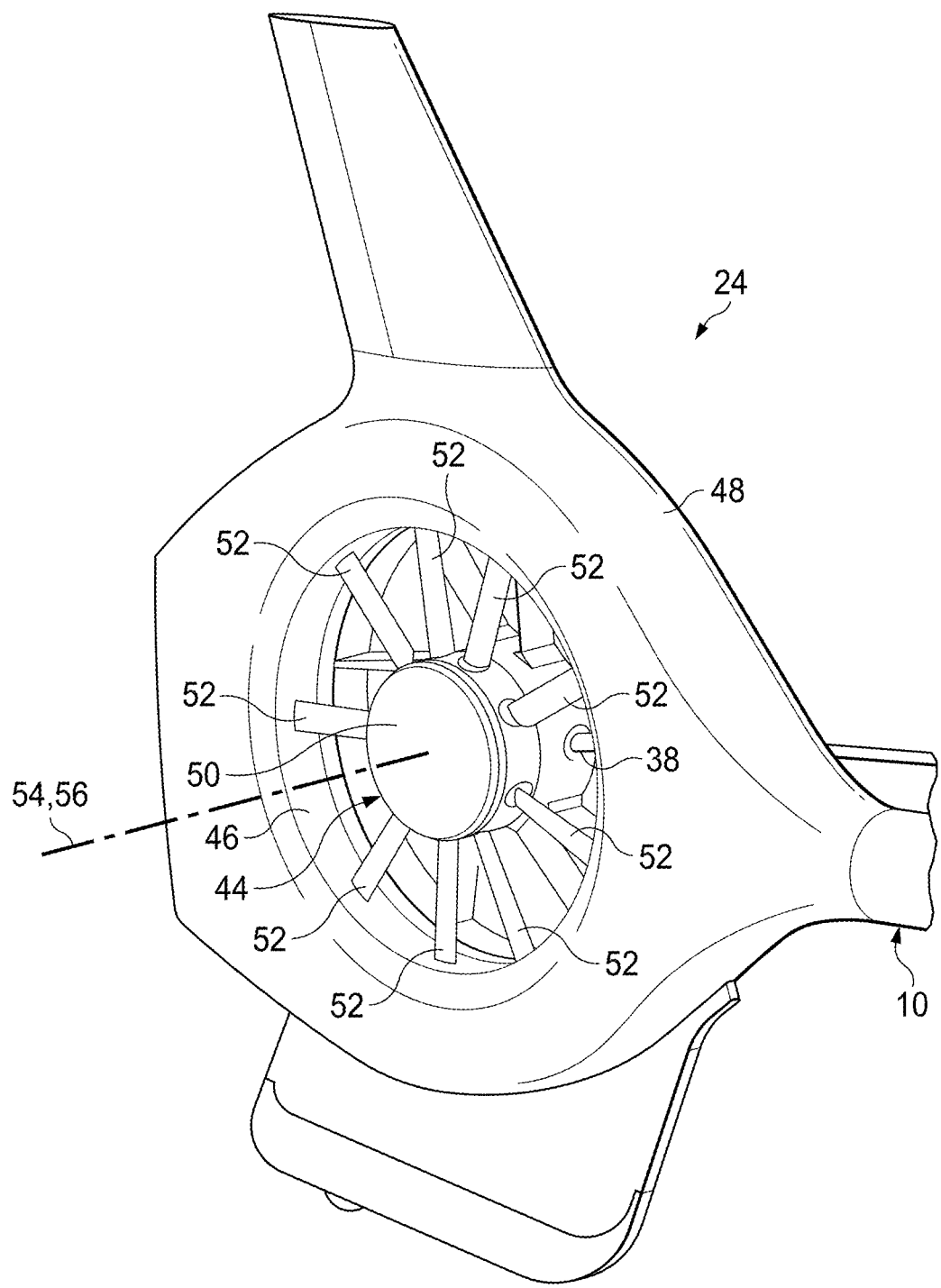
FIG. 2 illustrates an exemplary anti-torque rotor implementing a spherical bearing centrifugal force retention link.
Figure 5:
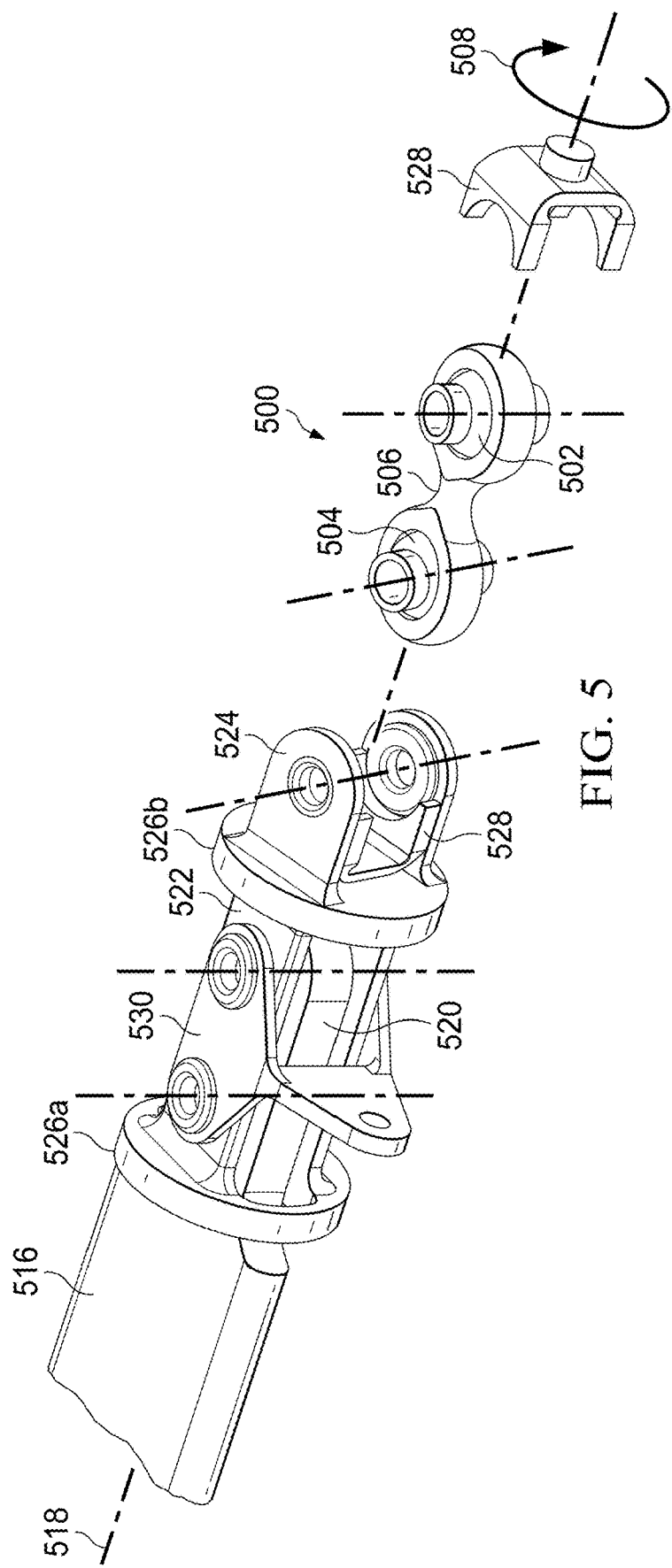
FIG. 5 illustrates an exemplary spherical bearing centrifugal force retention link with a rotor blade.

FIG. 2 illustrates an exemplary anti-torque tail rotor assembly 24 implementing a spherical centrifugal force retention link 500 (FIG. 5). In this embodiment, tail rotor assembly 24 is a ducted fan. The ducted fan 24 includes a rotor 44 mounted within a duct 46 that extends through a shroud 48 of a tail portion of rotorcraft 10. Rotor 44 is rotatably mounted within duct 46 and includes a hub 50 and a plurality of blades 52. Rotor 44 may include any suitable number of blades 52, e.g., nine blades, as illustrated in FIG. 2. Hub 50 is rotatable about a rotational axis 54 that is coaxial with a central axis 56 of duct 46. Blades 52 extend radially from hub along a pitch change axis. Blades 52 are coupled to hub 50 with a spherical bearing centrifugal link, see, e.g., FIGS. 5-9. The spherical bearings of the centrifugal force link react the centrifugal force radially and allow a total blade pitch range, for example of about 50 to 85 degrees. In an embodiment, the total blade pitch range is about 80 degrees.

Figure 3:
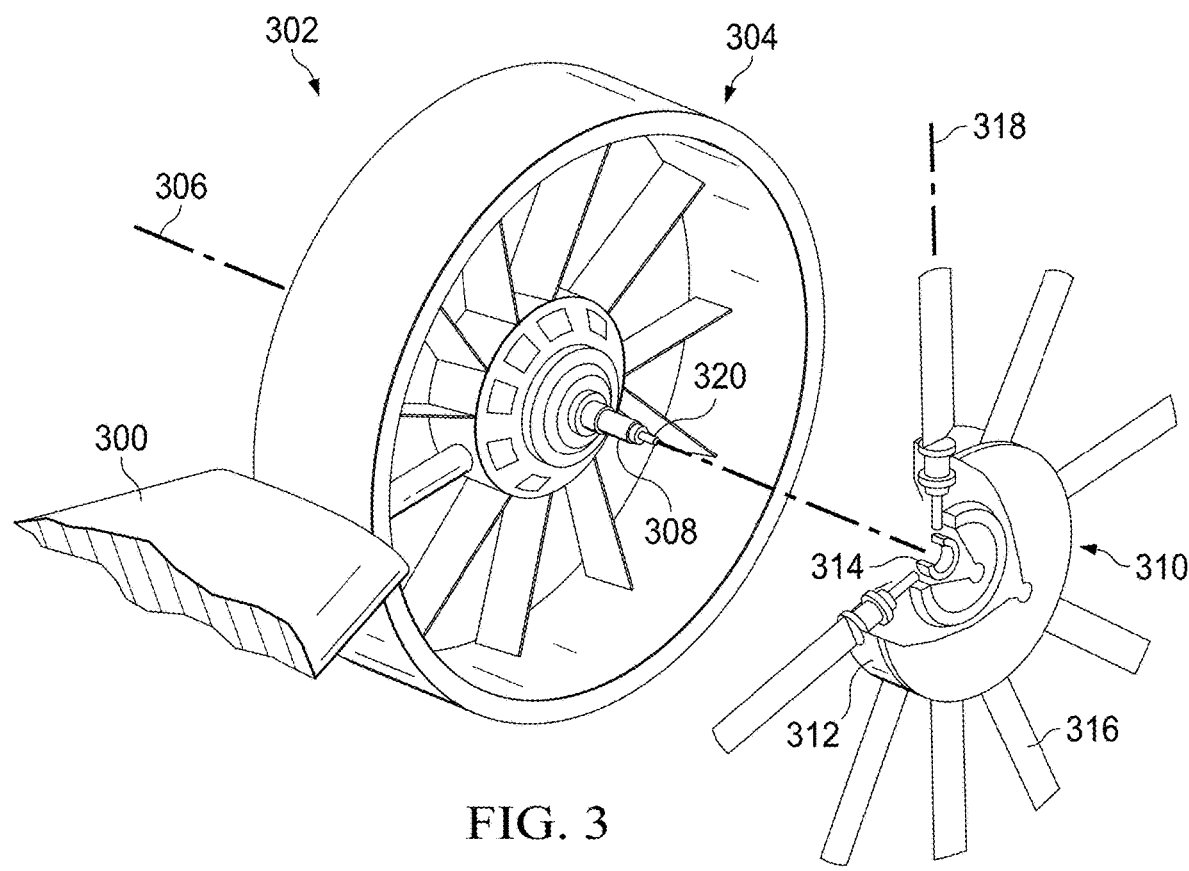
FIG. 3 illustrates an exemplary ducted fan implementing spherical bearing centrifugal force retention link.

FIG. 3 illustrates another exemplary rotor 302 in the form of a ducted fan. In this example, ducted fan 302 is pivotably coupled to a rotorcraft 300. Ducted fan 302 has a duct 304 with a central axis 306 and a rotor assembly 310 coupled to a shaft 308 to rotate about central axis 306. Rotor assembly 310 includes a rotor hub 312 with a central hub fitting 314 attached to shaft 308. Rotor blades 316 are attached to rotor hub 312 with a double spherical bearing centrifugal force link 500 (FIG. 5) and extend radially from rotor hub 312 along a pitch change axis 318. A control rod 320 for changing the pitch angle of blades 316 extends through shaft 308 and engages for example a spider 322 (FIG. 4) attached to pitch horns of the blades 316.

Figure 4:
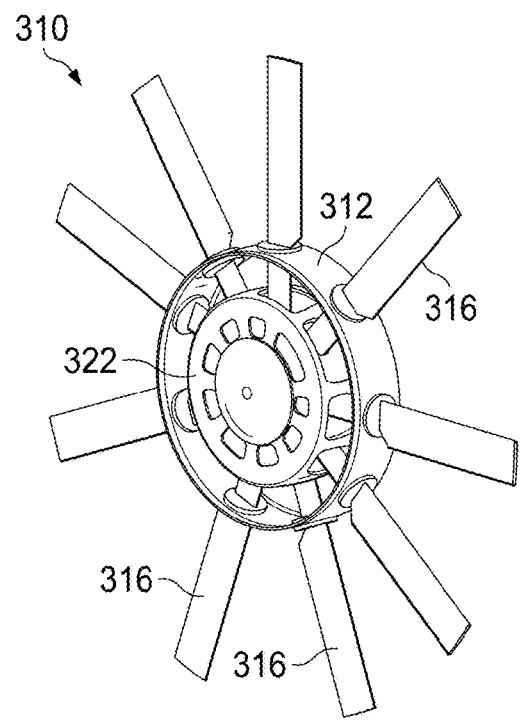
FIG. 4 illustrates an exemplary rotor blade assembly implementing a spherical bearing centrifugal force retention link.

FIG. 4 illustrates another view of exemplary rotor assembly 310. Rotor blades 316 are attached at their root ends to rotor hub 312. A spider 322 is connected to pitch horns 530 (FIG. 5) on each of the blades 316. Control rod 320 (FIG. 3) engages spider 322 to change the pitch angle of blades 316.

FIG. 5 illustrates an exemplary spherical bearing centrifugal force (CF) retention link 500 with a rotor blade 516. CF retention link 500 has dual spherical bearings 502, 504. Spherical bearings 502, 504 may be rod ends. With reference to a rotor assembly, the spherical bearings are identified as an inboard spherical bearing 502 and an outboard spherical bearing 504 relative to the rotational axis of the rotor hub. Inboard and outboard spherical bearings 502, 504 are attached to each other by a beam 506. Beam 506 is constructed of a material sufficient to restrict tension movement along blade pitch axis 518 caused by blade centrifugal force. Additionally, beam 506 has a high torsional stiffness to resist torsional (twisting) movement 508. Conventionally, rotor blades are connected to the rotor hub by a tension-torsion strap or bar that allows for torsional movement. In an exemplary embodiment, CF retention link 500 has a substantially constant torsional moment throughout the rotor blade pitch range, see, e.g., FIG. 10. The torsional moment exerted by a traditional tension-torsion strap increases, thereby increasing the control loads, as the blade pitch increases. CF retention link 500, with a substantially constant torsional moment throughout the pitch range, may significantly reduce peak moment and peak control loads compared to a rotor assembly using a tension-torsion strap.

Beam 506 may be constructed of various materials, including metal. In an embodiment, beam 506 is a solid member, e.g., metal member, as opposed to a member constructed of layers that allows torsional movement. Beam 506 may be constructed in various geometries and lengths to accommodate a particular rotor assembly.

Figure 6A:
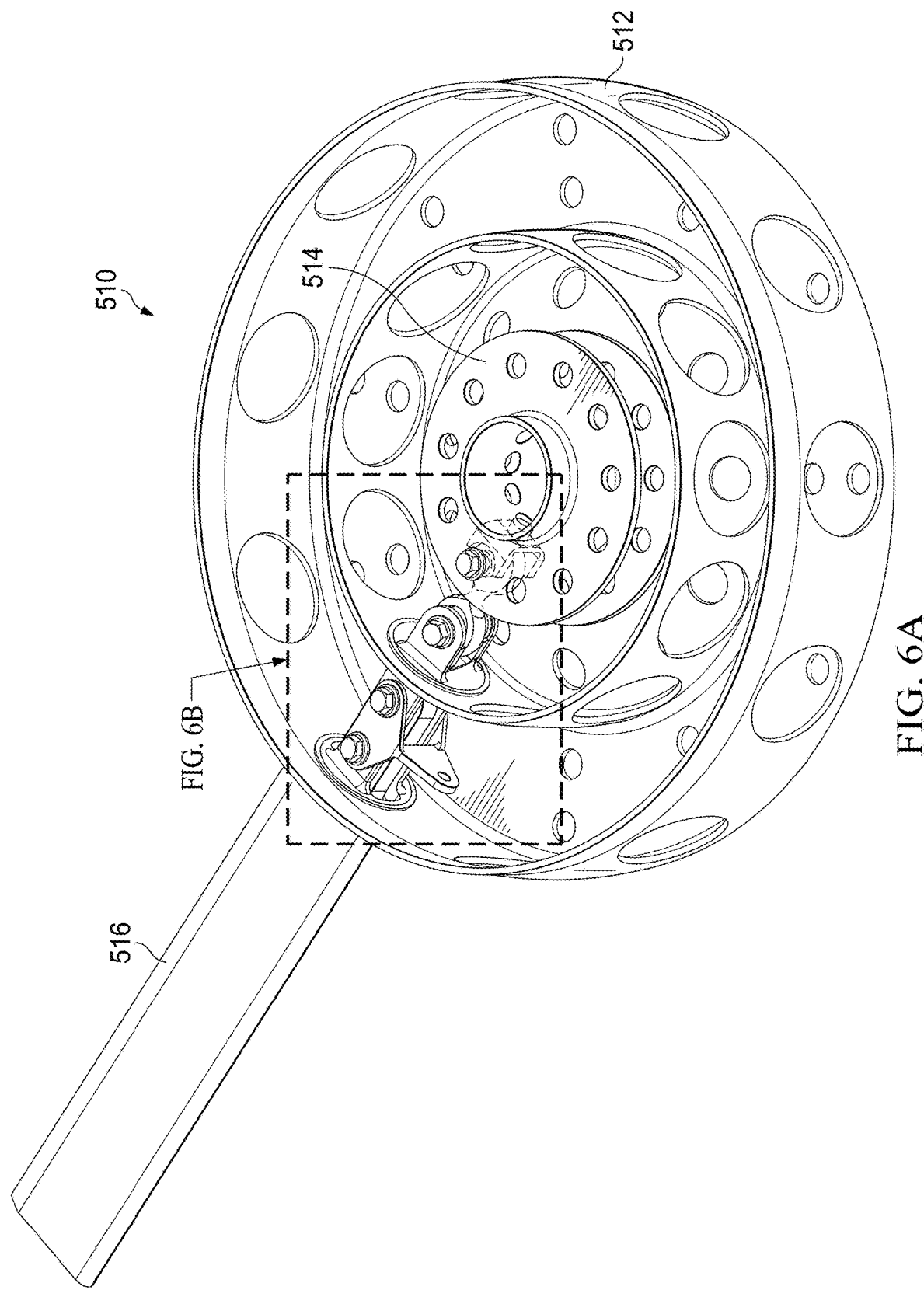
FIG. 6A illustrates an exemplary spherical bearing centrifugal force retention link in a rotor blade assembly.
Figure 6B:
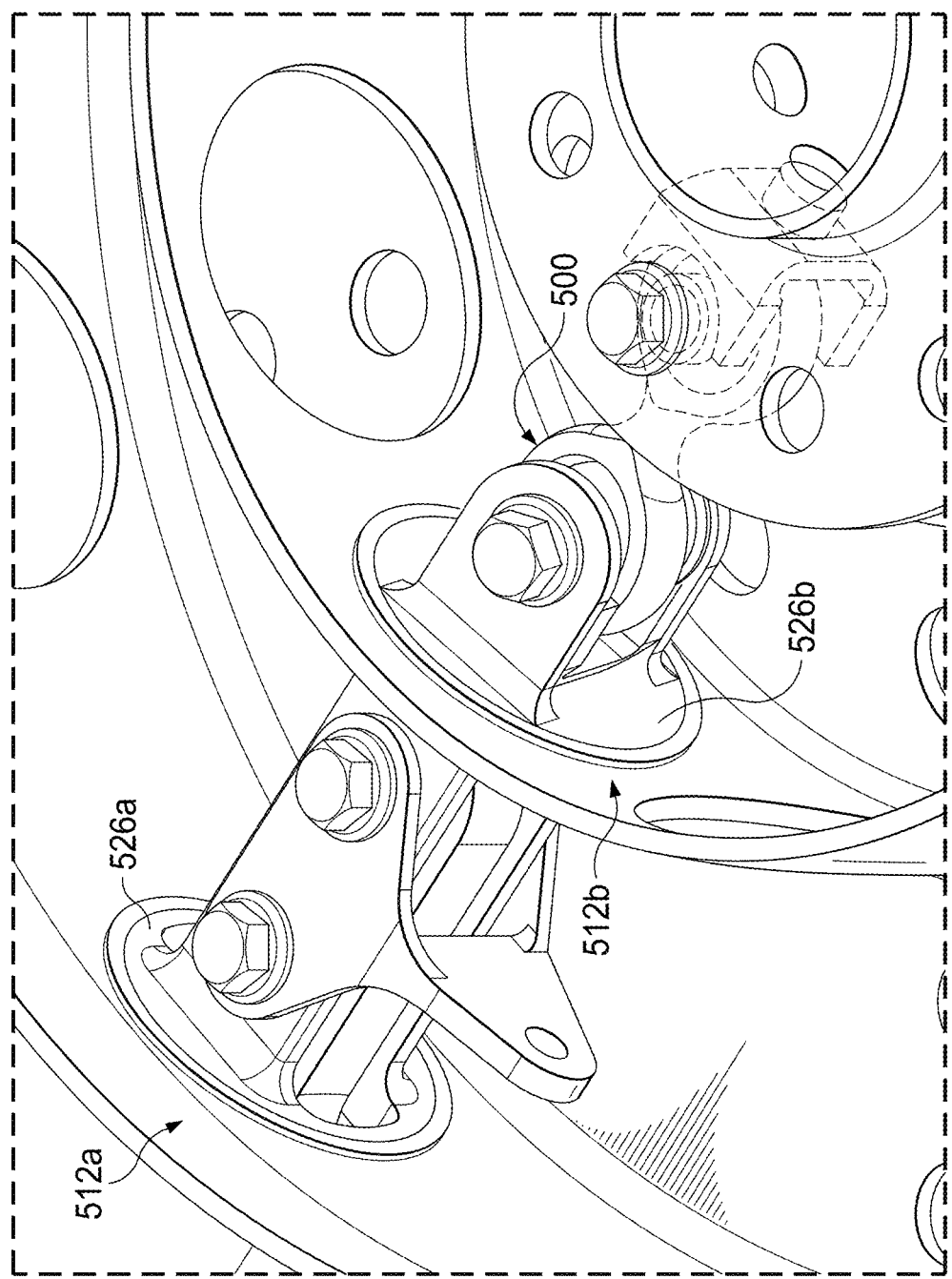
FIG. 6B is an expanded view of a portion of FIG. 6A.

With reference in particular to FIGS. 5, 6A, and 6B, rotor assembly 510 includes rotor blade 516 is connected to a rotor hub 512. Blade 516 extends radially from rotor hub 512 along pitch axis 518. Spherical bearing CF link 500 extends coaxially with pitch axis 518.

A blade grip 522 and pitch horn 530 are attached to root end 520 of blade 516 for example via bolted joint. Blade grip 522 has an inboard end 524, shown as a clevis, and blade grip portions 526a, 526b outboard of the inboard end. Outboard spherical bearing 504 attaches to inboard end 524 and inboard spherical bearing 502 attaches to central hub fitting 514 (FIG. 6A), e.g., drive hub. Spherical bearings 504 and 502 can be connected to the blade and the hub for example by bolts. Link rotations stops 528 may be located with each of the spherical bearings to protect the beam 506 from rotating beyond the maximum allowed bearing misalignment angle, e.g., 20 degrees. In an embodiment, the rotor blade pitch range is between about 50 to 85 degrees. In an embodiment, the rotor blade pitch range is between about 70 and 85 degrees. In an embodiment, the rotor blade pitch range is about 80 degrees. Blade grip portions 526a, 526b are rotationally coupled, e.g., torsion bearings, to hub 512 at locations 512a, 512b. The rotational connections at 512a, 512b allow the rotor blade pitch to be changed. Blade pitch input motion is transmitted for example from spider 322 (FIG. 4) to pitch horn 530 which is connected to blade grip 522 and blade 516.

Figure 7:
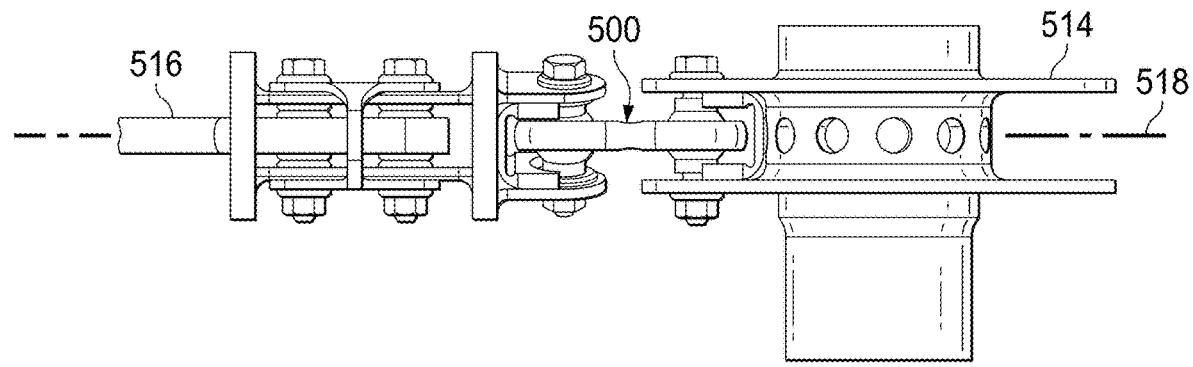
FIG. 7 illustrates a rotor blade implementing a spherical bearing centrifugal force retention link at a 0-degree pitch angle.
Figure 8:
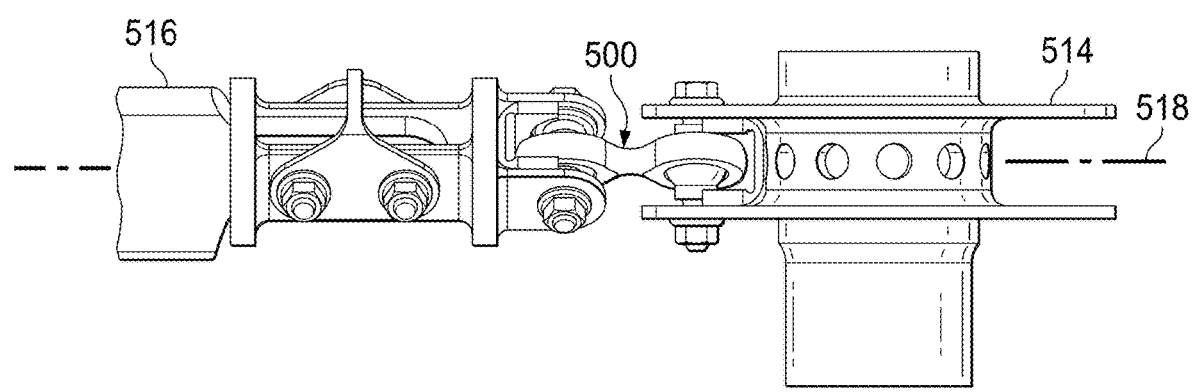
FIG. 8 illustrates a rotor blade implementing a spherical bearing centrifugal force retention link at a 50-degree pitch angle.
Figure 9:
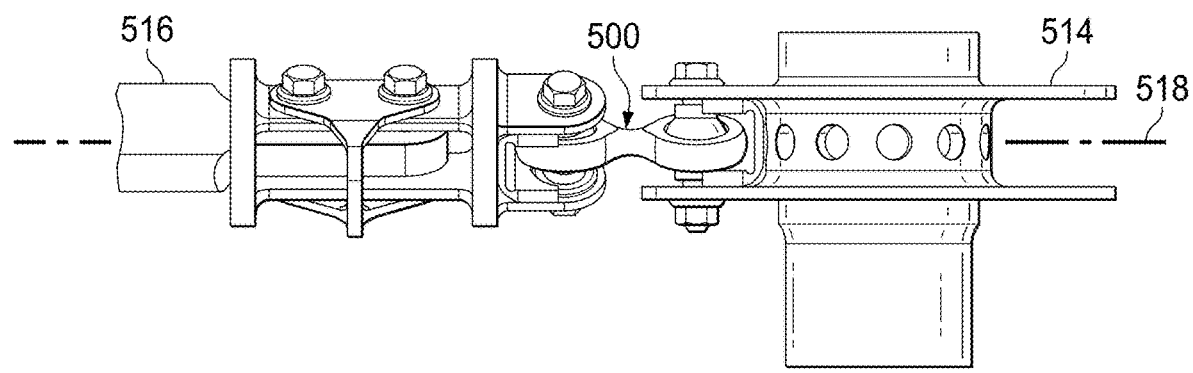
FIG. 9 illustrates a rotor blade implementing a spherical bearing centrifugal force retention link at a negative 25-degree pitch angle.

FIGS. 7-9 schematically illustrate rotor blade 516 coupled to central hub fitting 514 via spherical bearing CF link 500 and positioned at different pitch angles. Rotor blade 516 has a pitch axis 518 that defines a rotor plane, the pitch angle may be the angle between rotor plane and the chord of the blade. FIG. 7 illustrates blade 516 at a 0-degree pitch angle, FIG. 8 illustrates blade 516 at a positive 50-degree pitch angle, and FIG. 9 illustrates blade 516 at a negative 25-degree pitch angle.

Figure 10:
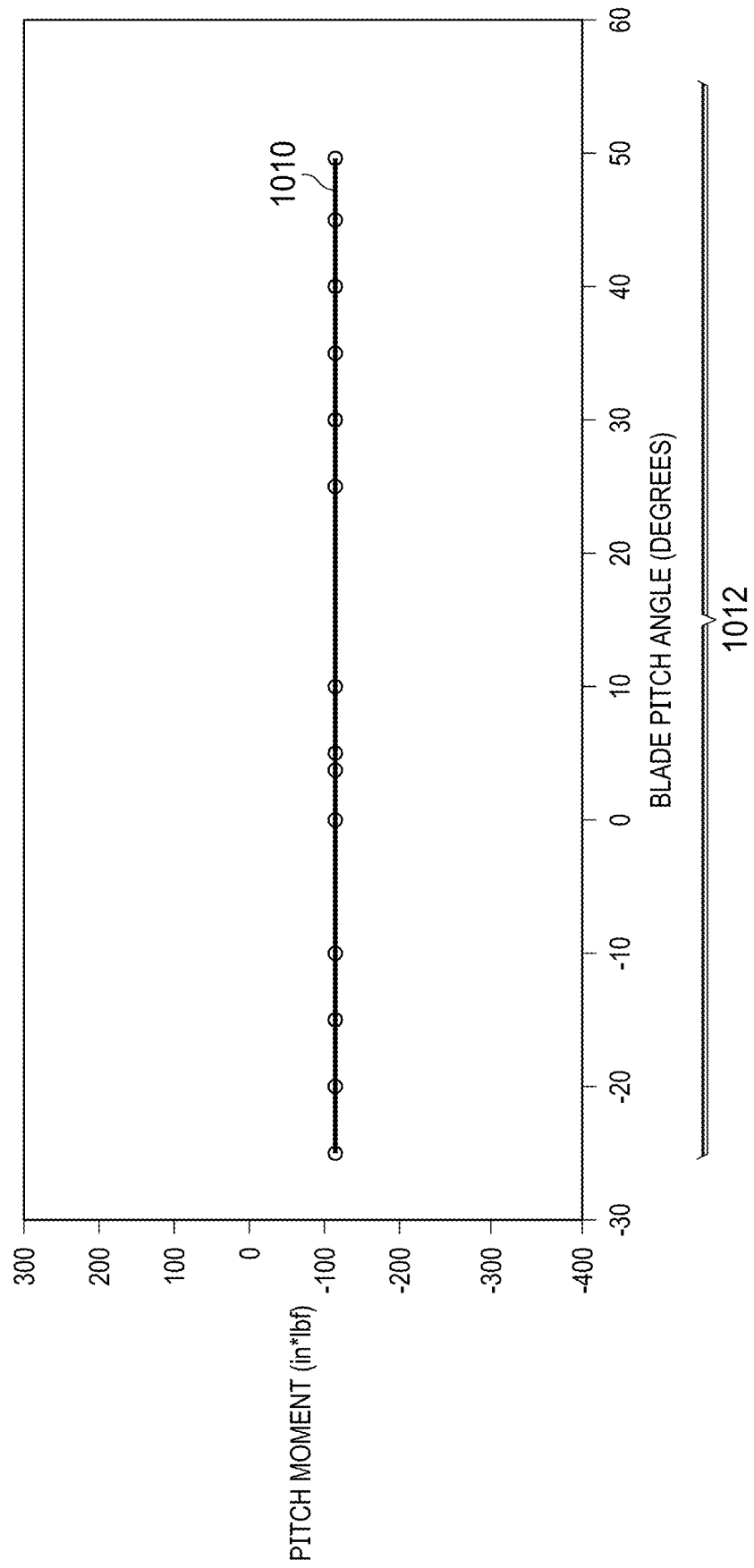
FIG. 10 graphically illustrates a spherical bearing centrifugal force retention link having a substantially constant torsional moment throughout a rotor blade pitch range.

FIG. 10 graphically illustrates an exemplary spherical bearing CF link having substantially constant torsional moment 1010 throughout a pitch angle range 1012 of about 80 degrees. Line 1010 represents pitching moment when increasing blade pitch absolute value. The pitching moment when increasing blade pitch absolute value and the pitching moment when decreasing blade pitch absolute value (not shown) are symmetric about the zero (0) pitch moment.

The term "substantially," "approximately," and "about" is defined as largely but not necessarily wholly what is specified (and includes what is specified; e.g., substantially 90 degrees includes 90 degrees and substantially parallel includes parallel), as understood by a person of ordinary skill in the art. The extent to which the description may vary will depend on how great a change can be instituted and still have a person of ordinary skill in the art recognized the modified feature as still having the required characteristics and capabilities of the unmodified feature. In general, but subject to the preceding, a numerical value herein that is modified by a word of approximation such as "substantially," "approximately," and "about" may vary from the stated value, for example, by 0.1, 0.5, 1, 2, 3, 4, 5, 10, or 15 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure and that they may make various changes, substitutions, and alterations without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A rotor blade assembly, comprising:
   a hub rotatable about a rotational axis;
   a rotor blade extending radially from the hub along a pitch axis and having a rotor blade pitch range; and
   a centrifugal force (CF) link having an inboard spherical bearing attached to the hub and an outboard spherical bearing attached to the rotor blade and a torsional moment of the CF link is constant throughout the rotor blade pitch range.

2. The rotor blade assembly of claim 1, wherein the CF link comprises a beam between the inboard spherical bearing and the outboard spherical bearing.

3. The rotor blade assembly of claim 1, wherein the rotor blade pitch range is between 70 and 85 degrees.

4. The rotor blade assembly of claim 1, wherein the rotor blade pitch range is 50 to 85 degrees.

5. The rotor blade assembly of claim 1, wherein the inboard spherical bearing and the outboard spherical bearing react a centrifugal force radially.

6. The rotor blade assembly of claim 1, further comprising a blade grip having an inboard end connected to the outboard spherical bearing and a first blade grip portion rotationally coupled to the hub outboard of the inboard end.

7. The rotor blade assembly of claim 6, wherein the inboard spherical bearing and the outboard spherical bearing react a centrifugal force radially.

8. The rotor blade assembly of claim 7, wherein the rotor blade pitch range is 50 to 85 degrees.

9. The rotor blade assembly of claim 7, wherein the rotor blade pitch range is between 70 and 85 degrees.

10. A rotorcraft, comprising:
    a rotor comprising a hub rotatable about a rotational axis;
    a rotor blade extending radially from the hub along a pitch axis and having a rotor blade pitch range; and
    a centrifugal force (CF) link having an inboard spherical bearing attached to the hub and an outboard spherical bearing attached to the rotor blade, wherein the inboard spherical bearing and the outboard spherical bearing react centrifugal force radially, and a torsional moment of the CF link is constant throughout the rotor blade pitch range.

11. The rotorcraft of claim 10, wherein the rotor is located in a duct.

12. The rotorcraft of claim 10, wherein the rotor is an anti-torque rotor.

13. The rotorcraft of claim 10, wherein the rotor blade pitch range is between 70 and 85 degrees.

14. The rotorcraft of claim 10, wherein the rotor is a ducted anti-torque rotor; and
the rotor blade pitch range is between 70 and 85 degrees.

15. The rotorcraft of claim 10, wherein the rotor blade pitch range is between 50 to 85 degrees.

16. A ducted fan, comprising:
a duct having a central axis;
a rotor assembly located in the duct, the rotor assembly comprising:
a hub rotatable about a rotational axis coaxial with the central axis;
a rotor blade extending radially from the hub along a pitch axis and having a rotor blade pitch range; and
a centrifugal force (CF) link having an inboard spherical bearing attached to the hub and an outboard spherical bearing attached to the rotor blade, wherein the inboard spherical bearing and the outboard spherical bearing react centrifugal force radially, and a torsional moment of the CF link is constant throughout the rotor blade pitch range.

17. The ducted fan of claim 16, further comprising a blade grip having an inboard end connected to the outboard spherical bearing and a first blade grip portion rotationally coupled to the hub outboard of the inboard end.

18. The ducted fan of claim 16, wherein the rotor blade pitch range is between 70 and 85 degrees.

19. The ducted fan of claim 18, further comprising a blade grip having an inboard end connected to the outboard spherical bearing and a first blade grip portion rotationally coupled to the hub outboard of the inboard end.

20. The ducted fan of claim 16, wherein the rotor blade pitch range is between 50 to 85 degrees.

* * * * *